(12) United States Patent  
Carter et al.

(10) Patent No.: US 9,020,803 B2  
(45) Date of Patent: Apr. 28, 2015

(54) CONFIDENCE-RATED TRANSCRIPTION AND TRANSLATION

(71) Applicant: International Business Machines Corporation, Armonk, NY (US)

(72) Inventors: William S. Carter, Austin, TX (US); Brian J. Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 13/623,803

(22) Filed: Sep. 20, 2012

(65) Prior Publication Data

US 2014/0081617 A1    Mar. 20, 2014

(51) Int. Cl.
*G06F 17/28* (2006.01)
*G10L 15/32* (2013.01)
*G10L 15/01* (2013.01)

(52) U.S. Cl.
CPC *G10L 15/32* (2013.01); *G10L 15/01* (2013.01)

(58) Field of Classification Search
USPC .............................................. 704/2, 235, 277
See application file for complete search history.

(56) References Cited

U.S. PATENT DOCUMENTS

| | | | |
|---|---|---|---|
| 6,701,293 B2 | 3/2004 | Bennett et al. | |
| 7,472,066 B2 | 12/2008 | Kuo et al. | |
| 7,539,086 B2 | 5/2009 | Jaroker et al. | |
| 7,539,619 B1 | 5/2009 | Seligman et al. | |
| 7,668,718 B2 | 2/2010 | Kahn et al. | |
| 7,818,175 B2 | 10/2010 | Carus et al. | |
| 8,694,309 B1* | 4/2014 | Fisher et al. | 704/216 |
| 2002/0133340 A1* | 9/2002 | Basson et al. | 704/235 |
| 2003/0144837 A1 | 7/2003 | Basson et al. | |
| 2006/0025995 A1 | 2/2006 | Erhart et al. | |
| 2011/0161082 A1 | 6/2011 | Braho et al. | |
| 2012/0010869 A1 | 1/2012 | McCarley et al. | |
| 2012/0141959 A1* | 6/2012 | von Ahn Arellano et al. | 434/157 |

* cited by examiner

*Primary Examiner* — Abdul Azad

(74) *Attorney, Agent, or Firm* — Garg Law Firm, PLLC; Rakesh Garg; William J. Stock

(57) ABSTRACT

A method, system, and computer program product for creating confidence-rated transcription and translation are provided in the illustrative embodiments. An input is provided in a first form to a set of transcription applications. A set of transcriptions is received. A first and a second set of confidence ratings are assigned to a first and a second transcription, respectively. The confidence-rated first transcription and the confidence-rated second transcription are combined and provided to a set of translation applications. A set of translations is received. A third and a fourth set of confidence ratings are assigned to a first and a second translation, respectively. The confidence-rated first and second translations are combined and presented.

25 Claims, 10 Drawing Sheets

CONFIDENCE-RATED TRANSCRIPTION AND TRANSLATION

BACKGROUND

1. Technical Field

The present invention relates generally to a method, system, and computer program product for improving transcription and translation of content. More particularly, the present invention relates to a method, system, and computer program product for creating confidence-rated transcription and translation.

2. Description of the Related Art

Technology exists for automatically transcribing content from one form to another. For example, an automatic speech recognition application can transcribe audio content into textual data. Similarly, text-to-speech applications convert textual information into audio information.

Technology also exists for translating content from one language to another. For example, applications exist for translating English language text to Spanish, French, German, or any of hundreds of world languages and dialects. Stand-alone applications and online tools are available for converting text data from one language to another.

SUMMARY

The illustrative embodiments provide a method, system, and computer program product for creating confidence-rated transcription and translation. An embodiment provides an input in a first form to a set of transcription applications executing using a processor and a memory. The embodiment receives a set of transcriptions from the set of transcription applications. The embodiment assigns a first set of confidence ratings to a first transcription to form a confidence-rated first transcription. The embodiment assigns a second set of confidence ratings to a second transcription in the set of transcriptions to form a confidence-rated second transcription. A confidence rating in the first set of confidence ratings corresponds to a portion of the first transcription, and a confidence rating in the second set of confidence ratings corresponds to a portion of the second transcription. The embodiment combines the confidence-rated first transcription and the confidence-rated second transcription to form a combined confidence-rated transcription. The embodiment provides the combined confidence-rated transcription to a set of translation applications. The embodiment receives a set of translations from the set of translation applications. The embodiment assigns a third set of confidence ratings to a first translation to form a confidence-rated first translation. The embodiment assigns a fourth set of confidence ratings to a second translation in the set of translations to form a confidence-rated second translation. The embodiment combines the confidence-rated first translation and the confidence-rated second translation to form a combined confidence-rated translation. The embodiment presents the combined confidence-rated translation.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
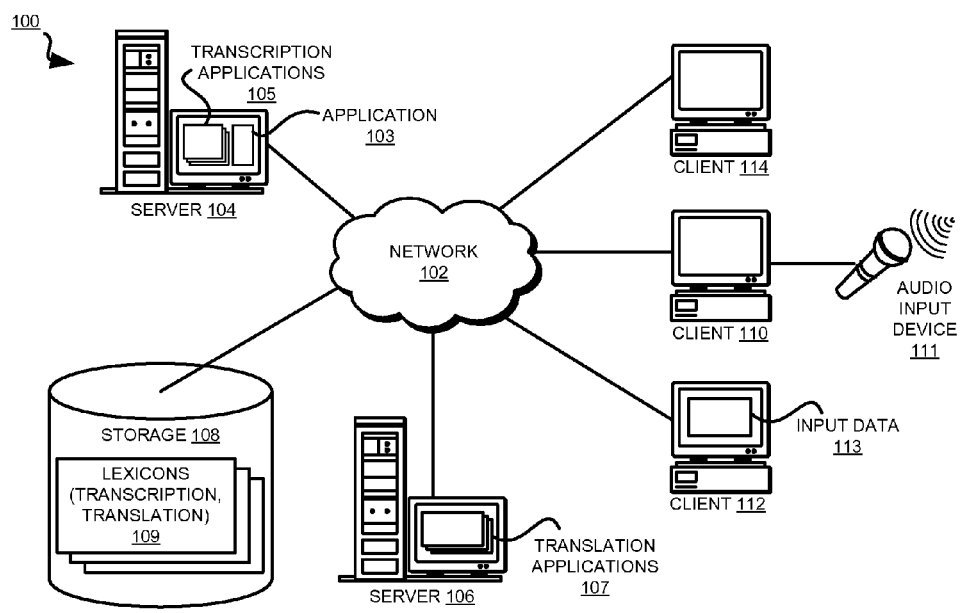
FIG. 1 depicts a pictorial representation of a network of data processing systems in which illustrative embodiments may be implemented.

The illustrative embodiments recognize that presently available technology for automated transcription and translation is error-prone. As some examples, the erroneous transcriptions and/or translations result from differing audio qualities, grammatical complexities, vocabulary matching, varying language models, and availability of samples in the language model being used. For example, the transcription/translation of simple and short phrases might be highly accurate, whereas the translation/transcription of lengthy prose might be suspect, and the translation/transcription of technical or cultural descriptions might be drastically incorrect.

The transcription and translation technology is particularly beneficial to users and viewers who may be afflicted with certain auditory or visual impairments. The illustrative embodiments recognize that for such users, the transcription and translation resulting from existing technologies provide no convenient way to detect the inaccuracies that may be present in the transcription or translation.

The illustrative embodiments recognize that automated processes for transcription and translation compound the problem further. For example, when a questionable transcription is translated, the result of the translation does not inform a user that potentially questionable transcription has been used in the translation. Consequently, a presently used automated method for transcription and translation may result in questionable translations, or worse, where errors in transcription may compound during translation. The illustrative embodiments recognize that for these and other similar reasons, users often abandon the use of automated transcriptions or translations for want of reliability in the transcription, translation, or both.

Therefore, the illustrative embodiments recognize a need for a way to detect and communicate the confidence of portions of automated transcriptions, translations, or both to a user. The user can be a human user or an application executing in a data processing system. The user can utilize those parts of the transcription or translation that exceed a certain confidence threshold, and give appropriate but cautious use to the parts that fall below or between other confidence thresholds.

The illustrative embodiments used to describe the invention generally address and solve the above-described problems and other problems related to automated transcription or translation of content. The illustrative embodiments provide a method, system, and computer program product for creating confidence-rated transcription and translation.

An embodiment processes input content using a set of one or more applications for each phase of transcription or translation. An embodiment assigns confidence ratings to portions of transcribed content and translated content from each application used in each phase. An embodiment compares, aligns, harmonizes, or aggregates the confidence-rated transcription and translation.

For example, in one embodiment, the higher the correlation between corresponding portions of transcriptions resulting from different transcription applications, the greater the confidence in that portion. In another embodiment, the higher the correlation between a portion of a transcript and a standard phrase, a human interpretation, or crowd-sourced transcribed notes, the higher the confidence in that portion of that transcript. Portions of other transcripts matching above or below a threshold degree of match with that portion are also accordingly assigned different confidence ratings.

An embodiment makes the confidence information available as metadata corresponding to a transcription or translation. The confidence-rated transcription and translation of an embodiment passes the confidence information from one phase to the next. A phase in an embodiment utilizes the confidence rating passed from a previous phase as a factor in generating the confidence in the current phase.

An embodiment can present the confidence metadata in such a manner that the metadata is both human readable and machine readable. Optionally, an embodiment presents the transcriptions and translations together, such as in an example side-by-side display.

Furthermore, an embodiment can display the confidence ratings of the various portions in textual form, graphical form, or a combination thereof. For example, an embodiment may display five example levels of confidence ratings using five different fonts, font colors, font weights, font styles, icons, highlights, animations, emphases, superscript or subscript, parenthetical information, or some combination thereof.

Additionally, an embodiment may also allow an option to display or hide the confidence information. An embodiment also allows displaying, hiding, or presenting differently, a portion with a certain confidence rating.

As an example operation of an embodiment, input content from an audio source is transcribed by three independent transcription applications in a transcription phase. The transcription applications may be different, may use different databases, language models, or a combination thereof. In the resulting three transcripts, those transcript portions that match with each other to a first degree across all three transcripts are given a first confidence rating, e.g., high confidence. Those transcript portions that match with each other to a first degree across only two out of the three transcripts are given a second confidence rating, e.g., medium confidence. Those transcript portions that do not match with each other across all three transcripts are given a third confidence rating, e.g., low confidence.

Portions with similar confidence ratings are aggregated, harmonized, merged, or otherwise combined to result in one transcribed portion corresponding to a portion of the input. A combined transcription with confidence information thus results from an embodiment.

The combined transcription with confidence information forms an input to the next phase, the translation phase. As an example, three independent translation applications are used in the translation phase to produce three different translations. The translation applications may be different from one another, may use different databases, or a combination thereof.

For example, the resulting three translations may present different arrangements of similar ideas contained in the combined transcription. An embodiment uses a combination of methods, such as grammar analysis, to find commonalities between different portions of the three translations and determines the differences in meaning.

As an example, an embodiment accords those portions in the three translations that differ in their meanings across all three translations, a first level of confidence, e.g., low confidence. Those portions in the three translations that have the same meaning in two of the three translations receive a second level of confidence, e.g., medium confidence. Those portions in the three translations that have the same meaning in all three translations receive a third level of confidence, e.g., high confidence.

An embodiment can combine or compare additional transcription or translation content with portions of the automated transcription and translation. For example, citations, crowd sourced transcriptions, live blogging content, tweets and other social content can be utilized as comparative transcription or translation, lexicon of current phrases, current language trends, or benchmark data in a particular subject matter domain of the input content.

An embodiment also allows authorized human users to mark a portion of a transcription or translation as good or bad, acceptable or not acceptable, reusable or not reusable, or using other manners of indicating acceptability. An embodiment also allows a user to correct the output of one phase before the output is used in a subsequent phase. Corrections in early phases increase resulting confidence ratings for the corrected portions in the later phases. Such corrections also improve the overall confidence in the combined results of each phase and in the final output of an embodiment.

Various embodiments provide various configurations in which the phases of the transcription and translation may be arranged. For example, the transcription translation processes may be completed in a linear fashion by aggregating transcriptions, rating for confidence, followed by translation, and rating the translations for confidence.

As another example, another configuration may transcribe and translate serially using one set of transcription application and translation application. The embodiment uses several such sets in parallel. The embodiment harmonizes and rates the transcribed-translated results from all the serialized parallel paths. Such a configuration may allow massively parallel architecture to be efficiently used in an implementation.

An embodiment does not place any limitations on when the confidence information may be presented to a user. For example, a single transcription or translation from a single transcription or translation application, together with their confidence information, can be hidden from the users or presented to the users.

The illustrative embodiments are described with respect to certain type, language, or form of content only as examples. Such descriptions are not intended to be limiting on the invention. For example, an illustrative embodiment can be implemented with respect to transcription from a mixed-media input, or translation in any language, in a similar manner within the scope of the illustrative embodiments.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
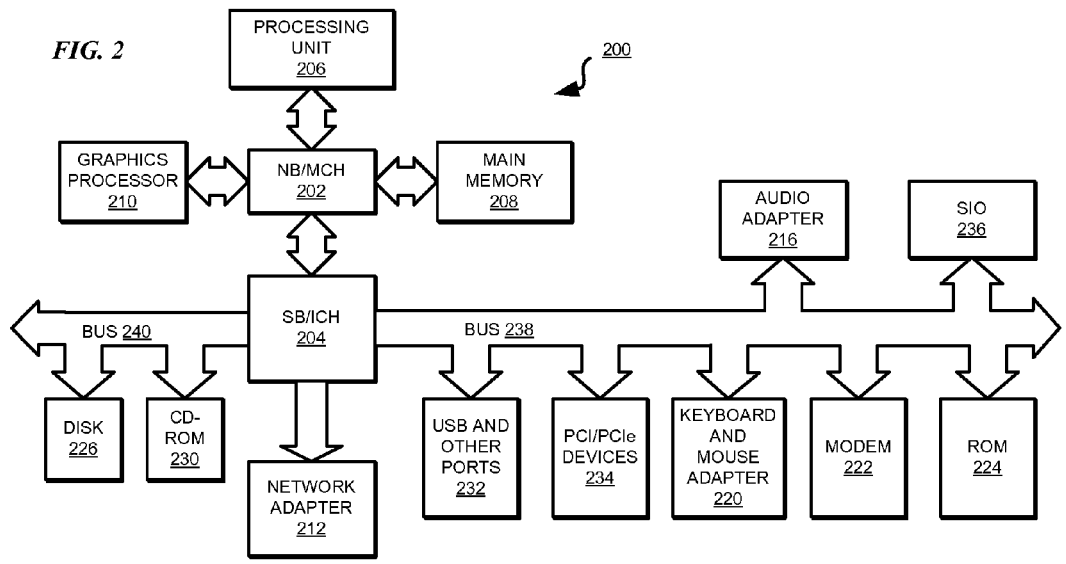
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that can be used in an embodiment. For example, server 104 includes application 103 that implements an embodiment. A data processing system, such as server 104, further includes set of transcription applications 105 that can transcribe content from any suitable form to any other suitable form. A data processing system, such as server 106, includes set of translation applications 107 that can translate content from any suitable language to any other suitable language. A data storage, such as storage 108, includes set of lexicons 109, a lexicon being usable for performing confidence-rated transcription and translation in conjunction with a configuration combining application 103, one or more transcription applications 105, and one or more translation applications 107. Input data 113 may be generated at a data processing system, such as client 112. For example, audio device 111 operating in conjunction with client 110 may capture audio data and store the audio data as input data 113. Lexicons 109 are not intended to be limited to language dictionaries, but can include thesauri, collections of sample words or phrases, repositories of preferred meanings or interpretations, and other such data usable with an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 103, transcription applications 105, and translation applications 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
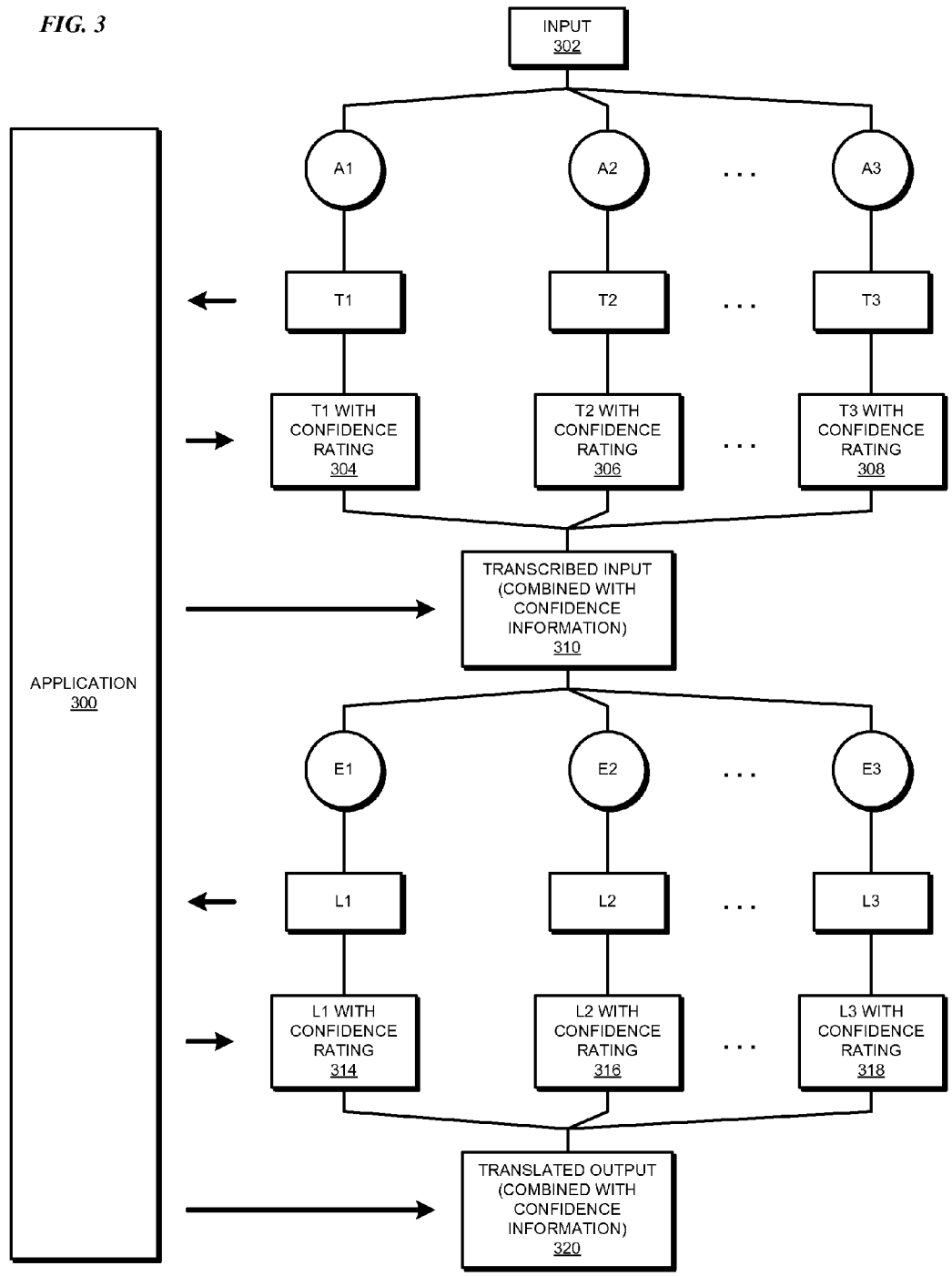
FIG. 3 depicts a block diagram of an example configuration for creating confidence-rated transcription and translation in accordance with an illustrative embodiment.

With reference to FIG. 3, this figure depicts a block diagram of an example configuration for creating confidence-rated transcription and translation in accordance with an illustrative embodiment. Application 300 is usable as application 103 in FIG. 1, and implements an embodiment. Input 302 is analogous to input 113 in FIG. 1.

For the clarity of the illustrations in this and subsequent figures, certain applications are represented symbolically, and other applications are represented by their function and outputs. Furthermore, three instances of the transcription applications and three instances of the translation applications are depicted only as examples and not as a limitation on the illustrative embodiments. Any number of transcription applications and translation applications can be used in an embodiment within the scope of the illustrative embodiments.

For example, blocks labeled A1, A2, and A3 represent distinct instances of transcription applications. Only as an example and not to imply a limitation on the illustrative embodiments, in one embodiment, transcription applications A1 and A2 may be different instances of the same transcription application, but processing input 302 using different transcription lexicons. In another example embodiment, transcription applications A1 and A2 are different transcription applications, such as different software products from different manufacturers. The same is true of transcription application A3.

Blocks labeled E1, E2, and E3 represent distinct instances of translation applications. Only as an example and not to imply a limitation on the illustrative embodiments, in one embodiment, translation applications E1 and E2 may be different instances of the same transcription application, but processing a transcription using different translation lexicons. In another example embodiment, translation applications E1 and E2 are different translation applications, such as different software products from different manufacturers. The same is true of translation application E3.

In the configuration depicted in FIG. 3 according to an embodiment, transcription applications A1, A2, and A3 participate in a transcription phase of the embodiment and execute in parallel therein. Translation applications E1, E2, and E3 participate in a translation phase of the embodiment and execute in parallel therein.

Transcription application A1 accepts input 302 and produces transcribed content T1. Similarly, Transcription application A2 accepts input 302 and produces transcribed content T2, and transcription application A3 accepts input 302 and produces transcribed content T3.

Application 300 accepts transcribed content T1, T2, and T3 as inputs. Application 300 parses portions of Transcribed contents T1, T2, and T3, compares the portions with each other, compares the portions with other lexicons, such as one or more of lexicons 109 in FIG. 1, for assessing a level of confidence in the transcriptions performed by transcription applications A1, A2, and A3. Application 300 assigns confidence ratings to the portions of transcribed contents T1, T2, and T3 to form "transcribed contents with confidence ratings" 304, 306, and 308.

Application 300 aggregates, merges, or otherwise combines contents 304, 306, and 308 into combined transcribed input 310. Combined transcribed input 310 includes confidence information relative to various portions of combined transcribed input 310. The confidence information associated with portions of combined transcribed input 310 is derived using confidence ratings associated with corresponding portions of contents 304, 306, and 308.

For example, assume that one portion in content 304 matches with a similar portion in content 306 above a threshold level of match, but below the threshold level with a similar portion in content 308. Application 300 includes the portion from content 304 into combined transcribed input 310. Application 300 assigns an intermediate level of confidence, such as a medium level of confidence on a three-level confidence scale, as in an example described earlier.

As another example, assume that one portion in contents 304 compares with similar portions in contents 306 and 308. The comparable portions in contents 304, 306, and 308 match with each other below a threshold level of match. Application 300 selects one of the comparable portions from either content 304 or 306 or 308 according to a heuristic, logic, rule, lexicon, command, or instruction. Application 300 includes the selected portion in a corresponding location in combined transcribed input 310. Application 300 assigns a level of confidence that is lower than a threshold degree of confidence, to the portion in combined transcribed input 310. For example, application 300 may assign the portion a low level of confidence on a three-level confidence scale, as in an example described earlier.

Translation application E1 accepts combined transcribed input 310 and produces translated content L1. Similarly, translation application E2 accepts combined transcribed input 310 and produces translated content L2, and translation application E3 accepts combined transcribed input 310 and produces translated content L3.

Application 300 accepts translated content L1, L2, and L3 as inputs. Application 300 parses portions of translated contents L1, L2, and L3, compares the portions with each other, compares the portions with other lexicons, such as one or more of lexicons 109 in FIG. 1, for assessing a level of confidence in the translations performed by translation applications E1, E2, and E3. Application 300 assigns confidence ratings to the portions of translated contents L1, L2, and L3 to form "translated contents with confidence ratings" 314, 316, and 318.

Application 300 aggregates, merges, or otherwise combines contents 314, 316, and 318 into combined translated output 320. Combined translated output 320 includes confidence information relative to various portions of combined translated output 320. The confidence information associated with portions of combined translated output 320 is derived using confidence ratings associated with corresponding portions of contents 314, 316, and 318.

For example, assume that one portion in content 314 matches with a similar portion in content 316 above a threshold level of match, such as textual or grammatical match, but below the threshold level with a similar portion in content 318. Application 300 includes the portion from content 314 into combined translated output 320. Application 300 assigns an intermediate level of confidence, such as a medium level of confidence on a three-level confidence scale, as in an example described earlier.

As another example, assume that one portion in contents 314 compares with similar portions in contents 316 and 318. The comparable portions in contents 314, 316, and 318 match with each other below a threshold level of match. Application 300 selects one of the comparable portions from either content 314 or 316 or 318 according to a heuristic, logic, rule, lexicon, command, or instruction. Application 300 includes the selected portion in a corresponding location in combined translated output 320. Application 300 assigns a level of confidence that is lower than a threshold degree of confidence, to the portion in combined translated output 320. For example, application 300 may assign the portion a low level of confidence on a three-level confidence scale, as in an example described earlier.

One embodiment presents combined translated output 320 to a user (not shown), together with a suitable manner of presenting the confidence ratings associated with various portions of combined translated output 320. Another embodiment presents combined transcribed input 310 and combined translated output 320 to a user, together with a suitable manner of presenting the confidence ratings associated with various portions combined transcribed input 310 and combined translated output 320. Another embodiment presents a combination of content 304, content 306, content 308, combined transcribed input 310, content 314, content 316, content 318, and combined translated output 320 to a user, together with a suitable manner of presenting the confidence ratings associated with various portions of the combination.

Figure 4:
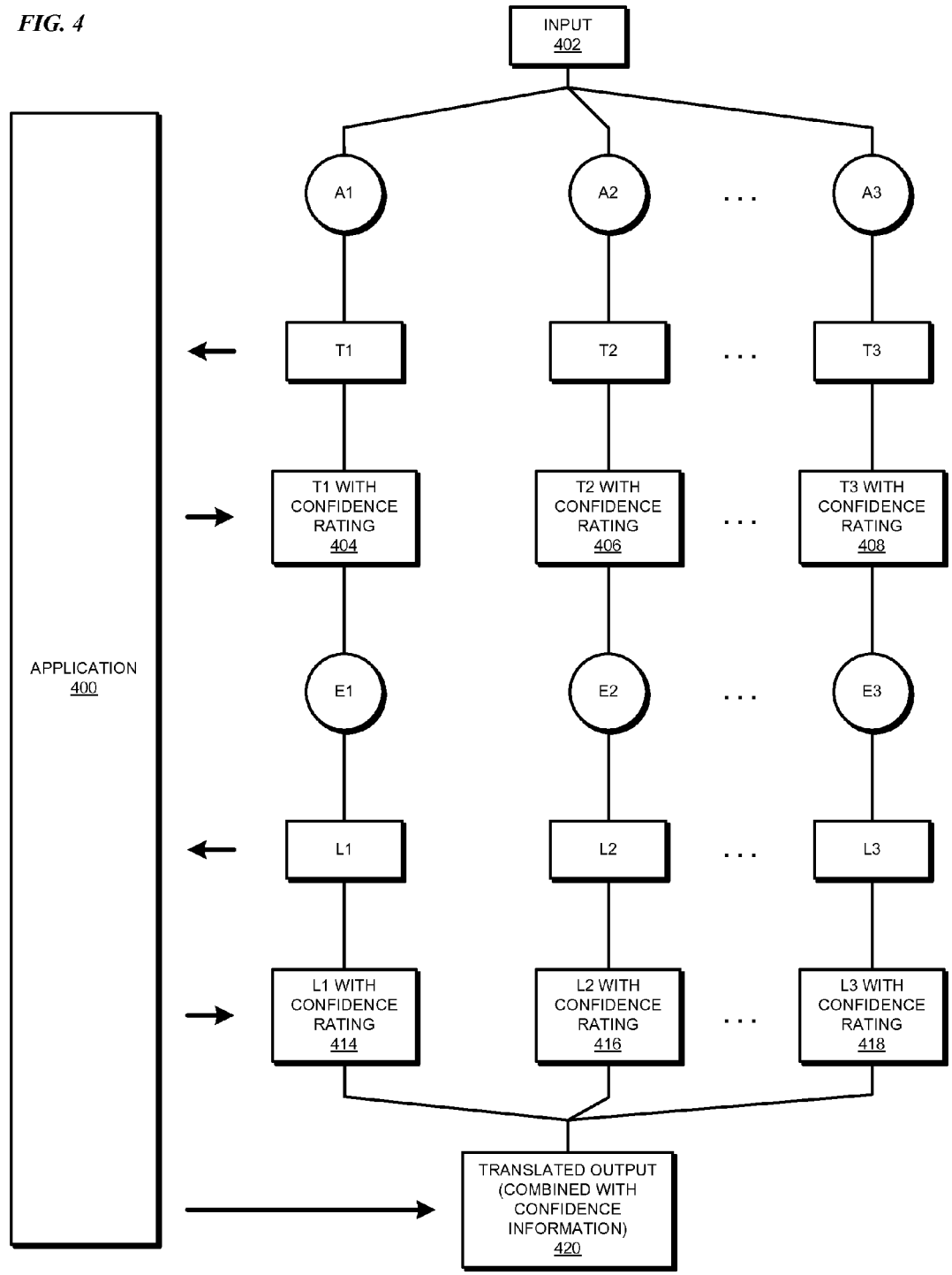
FIG. 4 depicts a block diagram of another example configuration for creating confidence-rated transcription and translation in accordance with an illustrative embodiment.

With reference to FIG. 4, this figure depicts a block diagram of another example configuration for creating confidence-rated transcription and translation in accordance with an illustrative embodiment. Application 400 is analogous to application 300 in FIG. 3, and implements an embodiment. Input 402 is analogous to input 302 in FIG. 3.

Blocks labeled A1, A2, A3, T1, T2, T3, E1, E2, E3, L1, L2, and L3 correspond to similar respective artifacts in FIG. 3. Contents with reference numerals 404, 406, 408, 414, 416, 418, and 420 correspond to contents with reference numerals 304, 306, 308, 314, 316, 318, and 320 respectively in FIG. 3, and are produced in an analogous manner by application 400.

In the configuration depicted in FIG. 4 according to an embodiment, transcription applications A1, A2, and A3 participate in a transcription phase of the embodiment. Translation applications E1, E2, and E3 participate in a translation phase of the embodiment. However, as distinct from the configuration depicted in FIG. 3, an instance of a transcription application is serialized with an instance of a translation application, and such serial sets of transcription applications and translation applications execute in parallel in the embodiment.

In such a configuration, the outputs of the transcription applications are not aggregated, merged, or otherwise combined to produce a combined transcribed input, such as combined transcribed input 310 in FIG. 3. In this configuration, a translation application executes serially after a transcription application, using the output of that transcription application as an input.

For example, transcription application A1 accepts input 402 and produces transcribed content T1. Application 400 accepts transcribed content T1, T2 as input. Application 400 parses portions of transcribed content T1, compares the portions with other transcribed contents T2 and T3 produced in a similar manner, compares the portion of transcribed content T1 with other lexicons for assessing a level of confidence in the transcription performed by transcription application A1. Application 400 assigns confidence ratings to the portions of transcribed content T1 to form "transcribed content with confidence ratings" 404. Application 400 produces contents 406 and 408 in a similar manner.

Translation application E1 accepts content 404 and produces translated content L1. Application 400 accepts translated content T1 as input. Application 400 parses portions of translated content L1, compares the portions with other translated contents L2 and L3 produced in a similar manner, compares the portions with other lexicons for assessing a level of confidence in the translations performed by translation application E1. Application 300 assigns confidence ratings to the portions of translated content L1 to form "translated content with confidence ratings" 414.

Application 400 produces contents 416 and 418 in a similar manner. Application 400 aggregates, merges, or otherwise combines contents 414, 416, and 418 into combined translated output 420. Combined translated output 420 includes confidence information relative to various portions of combined translated output 420 as described with respect to FIG. 3. Also as described with respect to FIG. 3, various embodiments present various combinations of content 404, content 406, content 308, content 414, content 416, content 418, and combined translated output 420 to a user, together with a suitable manner of presenting the confidence ratings associated with various portions of the combination.

Figure 5:
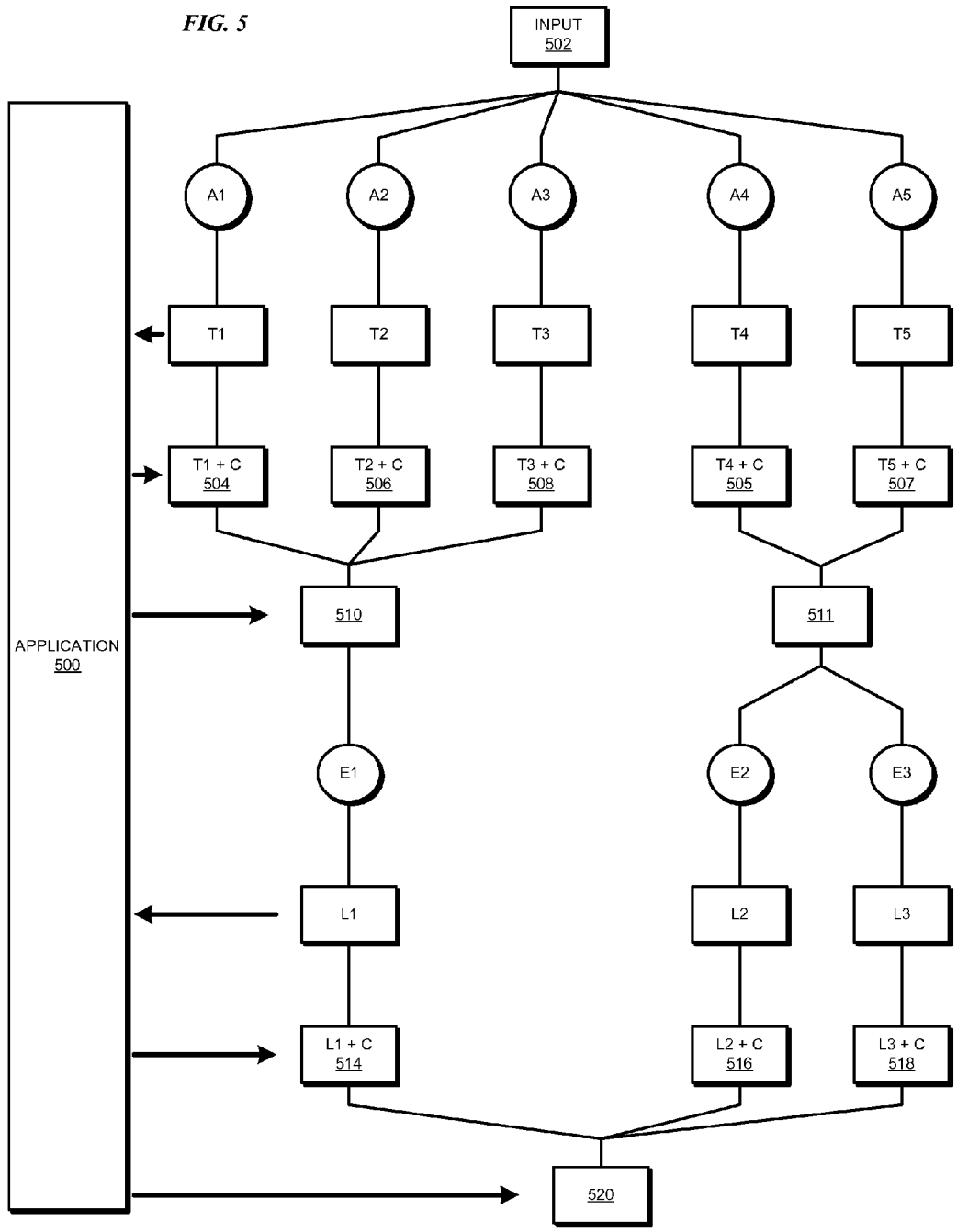
FIG. 5 depicts a block diagram of another example configuration for creating confidence-rated transcription and translation in accordance with an illustrative embodiment.

With reference to FIG. 5, this figure depicts a block diagram of another example configuration for creating confidence-rated transcription and translation in accordance with an illustrative embodiment. Application 500 is analogous to application 400 in FIG. 4, and implements an embodiment. Input 502 is analogous to input 402 in FIG. 4.

Similarly labeled blocks in FIGS. 4 and 5 correspond to each other in functions and operations. Contents with reference numerals 504, 506, 508, 514, 516, 518, and 520 correspond to contents with reference numerals 404, 406, 408, 414, 416, 418, and 420 respectively in FIG. 4, and are produced in an analogous manner by application 500.

Blocks labeled A4 and A5 represent additional instances of same or different transcription applications, in a manner similar to any of blocks A1, A2, or A3. Transcription applications A4 and A5 produce transcribed contents T4 and T5 in a manner analogous to the manner of producing transcribed contents from other transcription applications, such as transcribed content T1 from transcription application A1. Contents 505 and 507 are each produced in a manner analogous to the manner of producing any of contents 404, 406, and 408 in FIG. 4. Combined transcribed inputs 510 and 511 are each produced in a manner similar to the manner of producing combined transcribed input 310 in FIG. 3.

In the configuration depicted in FIG. 5 according to an embodiment, transcription applications A1, A2, A3, A4, and A5 participate in a transcription phase of the embodiment. Translation applications E1, E2, and E3 participate in a translation phase of the embodiment. However, as distinct from the configuration depicted in FIG. 3, different subsets of transcription applications are serialized with different subsets of translation applications. Such serial combinations of subsets of transcription applications and translation applications execute in parallel in the embodiment. Any number of transcription applications can participate in a subset of transcription applications, and any number of translation applications can participate in a subset of translation applications without any limitation.

In such a configuration, the outputs of a subset of transcription applications is aggregated, merged, or otherwise combined to produce a combined transcribed input, such as combined transcribed inputs 510 and 511, in a manner similar to the manner of producing combined transcribed input 310 in FIG. 3. In this configuration, a subset of translation applications executing serially after a subset of transcription applications, uses as input the combined transcribed input produced from the transcribed contents of that subset of transcription applications.

Such a configuration may be useful when the confidence level in the translation output of a translation application is known to exceed a threshold level, but the confidence level in the transcription output of the transcription applications is not. For example, when all or part of the translation is crowd-sourced, provided by a human, known to be reliable from previous experience, the configuration of FIG. 5 may provide an efficiency improvement over other configurations. This is not to imply that other configurations or embodiments cannot also receive and use similar translations.

Figure 6:
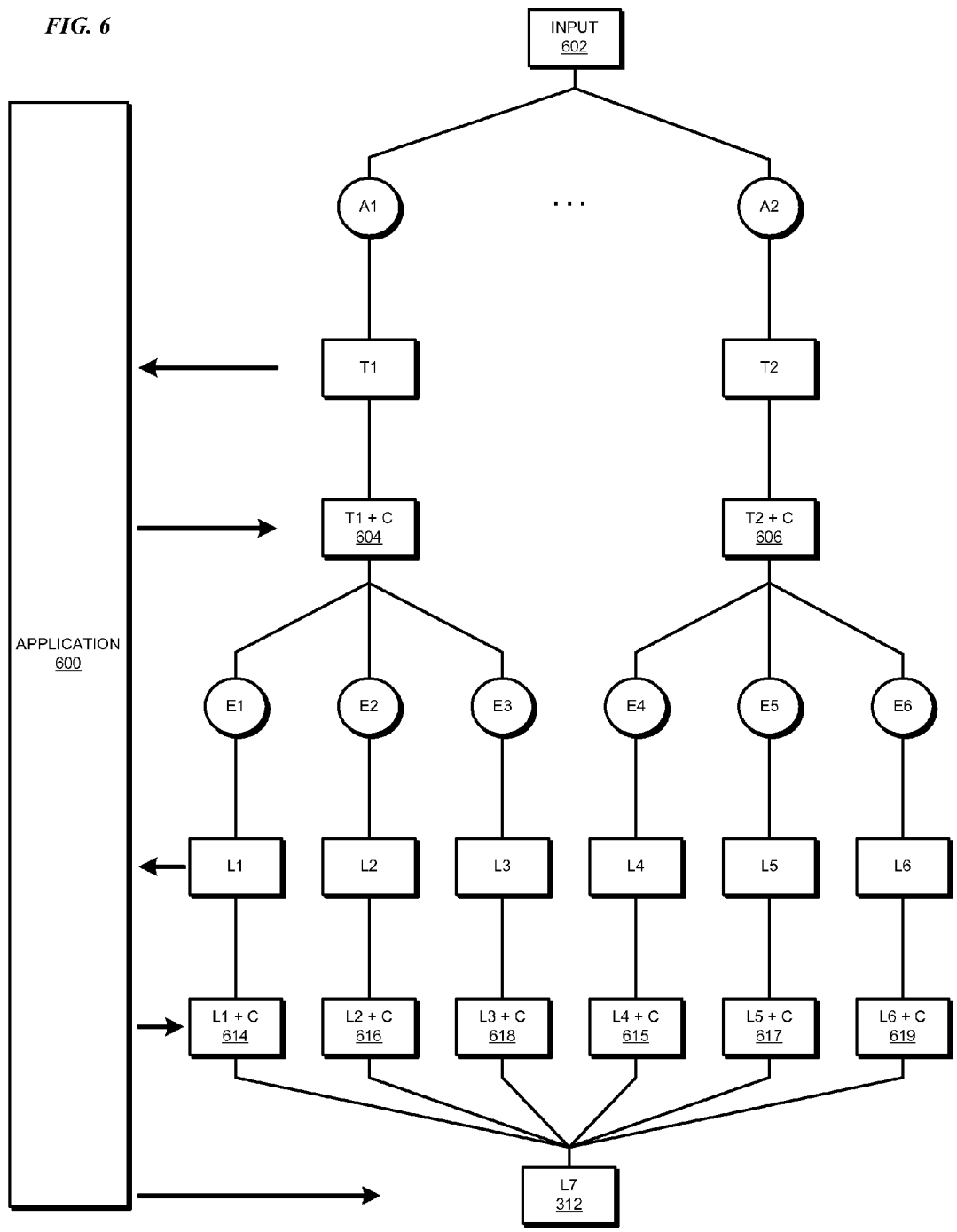
FIG. 6 depicts a block diagram of another example configuration for creating confidence-rated transcription and translation in accordance with an illustrative embodiment.

With reference to FIG. 6, this figure depicts a block diagram of another example configuration for creating confidence-rated transcription and translation in accordance with an illustrative embodiment. Application 600 is analogous to application 500 in FIG. 5, and implements an embodiment. Input 602 is analogous to input 502 in FIG. 5.

Similarly labeled blocks in FIGS. 5 and 6 correspond to each other in functions and operations. Contents with reference numerals 604, 606, 614, 616, 618, and 620 correspond to contents with reference numerals 504, 506, 514, 516, 518, and 520 respectively in FIG. 5, and are produced in an analogous manner by application 600.

Blocks labeled E4, E5, and E6 represent additional instances of same or different translation applications, in a manner similar to any of blocks E1, E2, or E3. Translation applications E4, E5, and E6 produce translated contents L4, L5, and L5 in a manner analogous to the manner of producing translated contents from other translation applications, such as translated content L1 from translation application E1. Contents 604 and 606 are each produced in a manner analogous to the manner of producing any of contents 504, 506, and 508 in FIG. 5. Transcribed content 604 is provided to one subset of translation applications, and transcribed content 606 is provided to another subset of translation applications in a manner similar to the manner of providing transcribed content 404 to one translation application, translation application E1, in FIG. 4.

In the configuration depicted in FIG. 6 according to an embodiment, transcription applications A1 and A2 participate in a transcription phase of the embodiment. Translation applications E1, E2, E3, E4, E5, and E6 participate in a translation phase of the embodiment. However, in a manner similar to the configuration depicted in FIG. 4, different subsets of transcription applications are serialized with different subsets of translation applications. Such serial combinations of subsets of transcription applications and translation applications execute in parallel in the embodiment. Although only one transcription application A1 is shown to provide input to a several translation applications, any number of transcription applications can participate in a subset of transcription applications, and any number of translation applications can participate in a subset of translation applications without any limitation. In effect, FIG. 6 operates as several configurations of FIG. 4 executing in parallel.

In the depicted configuration, a subset of translation applications executing serially after a transcription application, uses as input the combined transcribed content produced from the that transcription application. Such a configuration may be useful when the confidence level in the transcription output of a transcription application is known to exceed a threshold level, but the confidence level in the translation output of the translation applications is not. For example, when all or part of the transcription is crowd-sourced, provided by a human, known to be reliable from previous experience, the configuration of FIG. 6 may provide an efficiency improvement over other configurations. This is not to imply that other configurations or embodiments cannot also receive and use similar transcriptions.

Figure 7:
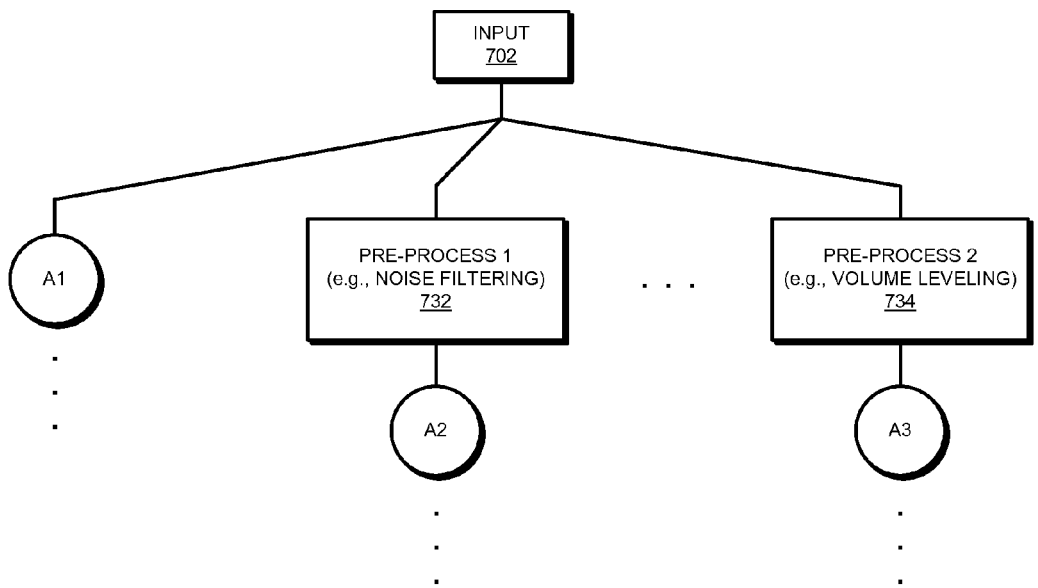
FIG. 7 depicts a block diagram of another example configuration that can be used with a configuration for creating confidence-rated transcription and translation in accordance with an illustrative embodiment.

With reference to FIG. 7, this figure depicts a block diagram of another example configuration that can be used with a configuration for creating confidence-rated transcription and translation in accordance with an illustrative embodiment. Input 702 is analogous to input 602 in FIG. 6.

The previous configurations and embodiments have been described using the input content as may be available from a source, such as audio input device 111 in FIG. 1. An embodiment can process the input before proceeding with a transcribing operation. For example, an embodiment can provide input 702 to transcription application A1 in the original form, but apply pre-processing 732, such as noise filtration, and provide the pre-processed form of input 702 to transcription application A2. Similarly, an embodiment can apply pre-processing 734, such as volume leveling, and provide a different pre-processed form of input 702 to transcription application A3. The remainder of the processing can proceed using any embodiment or configuration described herein.

Figure 8:
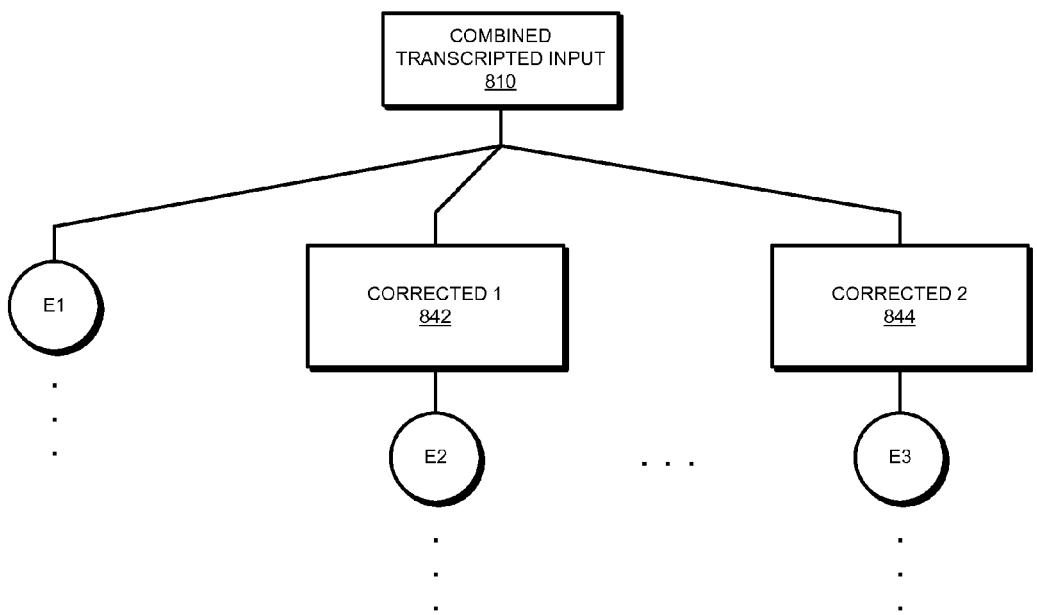
FIG. 8 depicts a block diagram of another example configuration that can be used with a configuration for creating confidence-rated transcription and translation in accordance with an illustrative embodiment.

With reference to FIG. 8, this figure depicts a block diagram of another example configuration that can be used with a configuration for creating confidence-rated transcription and translation in accordance with an illustrative embodiment. Combined transcribed input 810 is analogous to combined transcribed input 510 in FIG. 5 or transcribed content 604 in FIG. 6.

The previous configurations and embodiments have been described using the transcribed content or combined transcribed input as may be available from an application implementing an embodiment, such as application 500 in FIG. 5 or application 600 in FIG. 6. An embodiment can allow corrections, such as by a human user or a system or application, before proceeding with a translating operation. For example, an embodiment can provide combined transcribed input 810 to translation application E1 as produced by application 500 or 600, but apply corrections 842, such as changing a transcribed phrase according to a current language trend, and provide the pre-processed form of combined transcribed input 810 to translation application E2. Similarly, an embodiment can apply corrections 844, such as replacing a part of combined transcribed input 810 with crowd-sourced transcription of a part of a speech input, and provide a different pre-processed form of combined transcribed input 810 to translation application E3. The remainder of the processing can proceed using any embodiment or configuration described herein.

Figure 9:
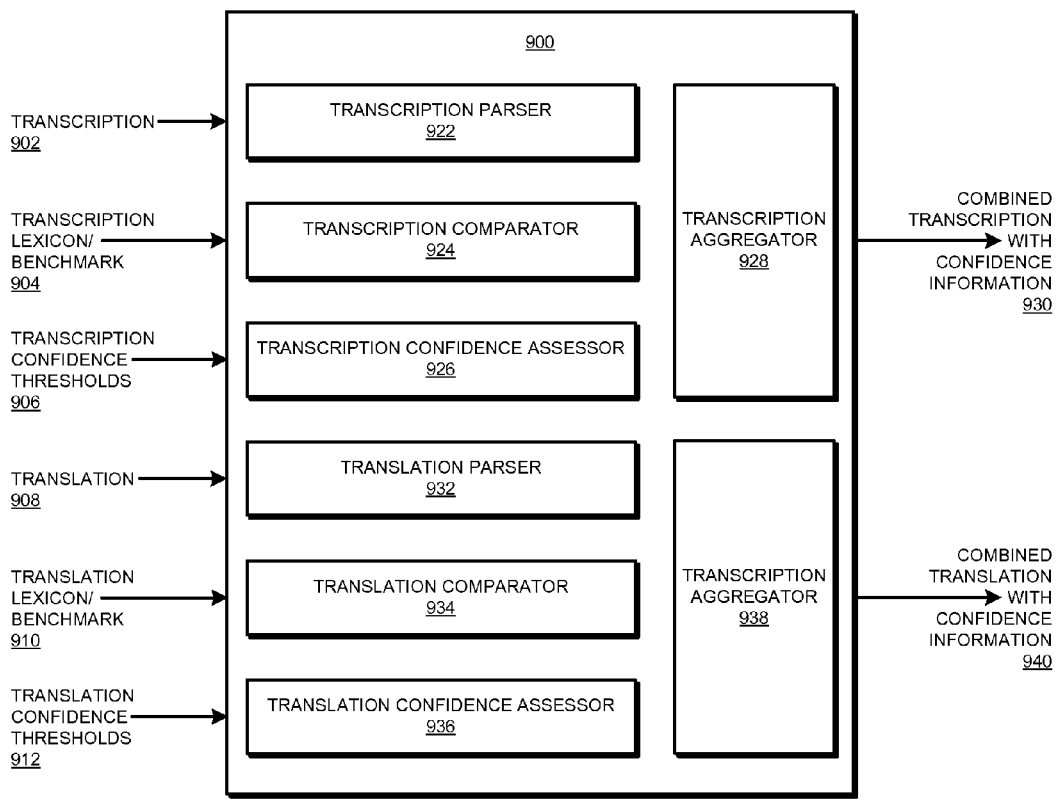
FIG. 9 depicts a block diagram of an example configuration of an application for confidence level assessment in confidence-rated transcription and translation in accordance with an illustrative embodiment.

With reference to FIG. 9, this figure depicts a block diagram of an example configuration of an application for confidence level assessment in confidence-rated transcription and translation in accordance with an illustrative embodiment. Application 900 can be used as application 600 in FIG. 6, application 500 in FIG. 5, application 400 in FIG. 4, application 300 in FIG. 3, or application 103 in FIG. 1.

For inputs, application 900 receives a combination of one or more transcriptions 902, lexicons or benchmarks usable for transcription comparison (collectively, transcription lexicon) 904, and a number of transcription confidence thresholds 906. Transcriptions 902 are similar to any of transcribed content T1-T5 in FIGS. 3-6, and can come from transcription applications, such as transcription applications A1-A5 in FIGS. 3-6.

Transcription lexicon 904 can be stored in a data processing system or a data repository, such as lexicons 109 in storage 108 in FIG. 1. Transcription lexicon 904 provides application 900 transcriptions other than transcribed contents from other transcription applications, that can be used as additional transcribed content, or benchmark against which to compare a portion of a transcribed content for confidence assessment. Transcription lexicon 904 can be pre-populated as standard data, crowd-sourced for a particular use, available on-demand during an execution of an embodiment, user-provided, or a combination thereof.

Any number of transcription confidence thresholds 906 can be used with application 900. For example, if two thresholds N1 and N2 are provided as transcription confidence thresholds 906, application 900 can assign one confidence level to a portion of transcription 902, if confidence level falls below N1. Similarly, application 900 can assign a second confidence level to a portion of transcription 902, if confidence level is between N1 and N2. Application 900 can assign a third confidence level to a portion of transcription 902, if confidence level exceeds N2. Similarly, three transcription confidence thresholds can provide at least four levels of confidence, eight thresholds can provide at least nine levels of confidence.

For additional inputs, application 900 receives a combination of one or more translations 908, lexicons or benchmarks usable for translation comparison (collectively, translation lexicon) 910, and a number of translation confidence thresholds 912. Translations 908 are similar to any of translated content L1-L6 in FIGS. 3-6, and can come from translation applications, such as translation applications E1-E6 in FIGS. 3-6.

Translation lexicon 910 can be stored in a data processing system or a data repository, such as lexicons 109 in storage 108 in FIG. 1. Translation lexicon 910 provides application 900 translations other than translated contents from other translation applications, that can be used as additional translated content, or benchmark against which to compare a portion of a translated content for confidence assessment. Translation lexicon 910 can be pre-populated as standard data, crowd-sourced for a particular use, available on-demand during an execution of an embodiment, user-provided, or a combination thereof.

Any number of translation confidence thresholds 912 can be used with application 900. For example, if two thresholds M1 and M2 are provided as translation confidence thresholds 912, application 900 can assign one confidence level to a portion of translation 908, if confidence level falls below M1. Similarly, application 900 can assign a second confidence level to a portion of translation 908, if confidence level is between M1 and M2. Application 900 can assign a third confidence level to a portion of translation 908, if confidence level exceeds M2. Similarly, four translation confidence thresholds can provide at least five levels of confidence, x number of thresholds can provide at least (x+1) levels of confidence.

Several example components are depicted and described in application 900 to perform the functions described with respect to the embodiments described herein. Such components or configuration thereof is not intended to be limiting on the illustrative embodiments, but only as an example. Those of ordinary skill in the art will be able to implement similar functions in other ways, and the same are contemplated within the scope of the illustrative embodiments.

Only as an example, transcription parser component 922 parses words, phrases, sentences, paragraphs, sections, or other language structures present in transcription 902 according to a language of transcription. Transcription comparator component 924 compares portions of various transcriptions 902 with each other, with transcription lexicon 904, or a combination thereof, to generate information usable for confidence assessment for the portions. Transcription confidence assessor component 926 uses the information from component 924 to assess and assign confidence levels to the portions according to transcription confidence thresholds 906. Component 926 may produce, or cause to be produced, a transcribed content with confidence rating, such as content 604, 504, 404, or 304 in FIGS. 6, 5, 4, and 3, respectively.

Transcription aggregator component 928 aggregates, merges, or otherwise combines the transcribed content with confidence ratings to form combined transcribed content with confidence information 930. Content 930 is similar to combined transcribed input 510 in FIG. 5, or 310 in FIG. 3.

Translation parser component 932 parses words, phrases, sentences, paragraphs, sections, or other language structures present in translation 908 according to a language of translation. Translation comparator component 934 compares portions of various translations 908 with each other, with translation lexicon 910, or a combination thereof, to generate information usable for confidence assessment for the portions. Translation confidence assessor component 936 uses the information from component 934 to assess and assign confidence levels to the portions according to translation confidence thresholds 912. Component 936 may produce, or cause to be produced, a translated content with confidence rating, such as content 614, 514, 414, or 314 in FIGS. 6, 5, 4, and 3, respectively.

Translation aggregator component 938 aggregates, merges, or otherwise combines the translated content with confidence ratings to form combined translated content with confidence information 940. Content 940 is similar to combined translated output 610, 510, 410, or 310 in FIG. 6, 5, 4, or 3, respectively.

Figure 10:
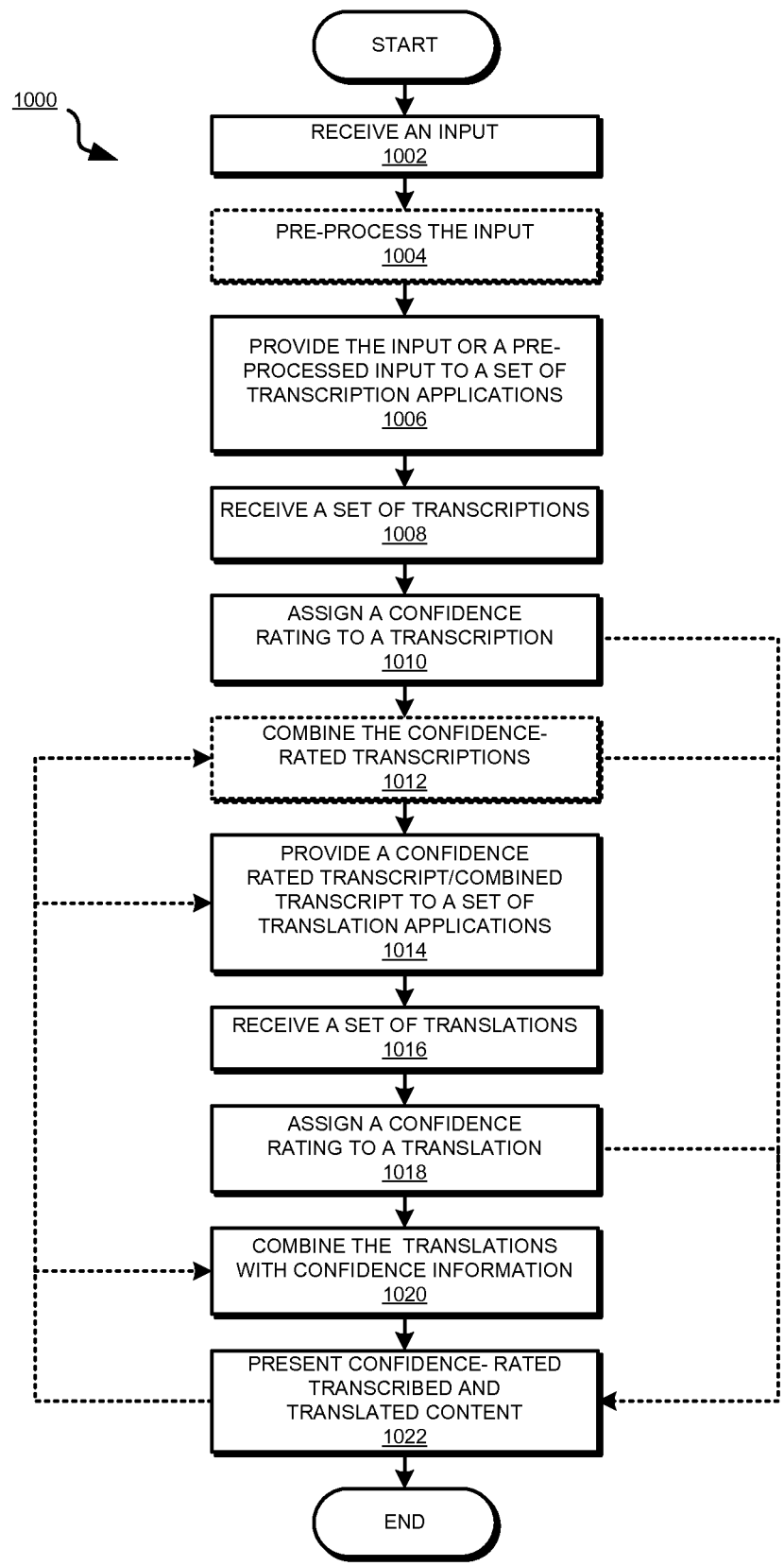
FIG. 10 depicts a flowchart of an example process for creating confidence-rated transcription and translation in accordance with an illustrative embodiment.

With reference to FIG. 10, this figure depicts a flowchart of an example process for creating confidence-rated transcription and translation in accordance with an illustrative embodiment. Process 1000 can be implemented in application 900 in FIG. 9.

Process 1000 begins by receiving an input, such as an audio data for transcription (step 1002). Optionally, process 1000 can pre-process the input received in step 1002 (step 1004). Process 1000 provides the input, or a pre-processed form of the input to a set of transcription applications (step 1006).

Process 1000 receives a set of transcriptions (step 1008). Process 1000 assigns a confidence rating to a transcription, such as by assigning confidence ratings to different portions of the transcription, as in content 504 in FIG. 5 (step 1010). Process 1000 combines the confidence-rated transcriptions, such as contents 504 and 506 to form combined transcribed input 510 (step 1012).

Process 1000 provides a confidence-rated transcript, or a confidence-rated combined transcript to a set of translation applications (step 1014).

Process 1000 receives a set of translations (step 1016). Process 1000 assigns a confidence rating to a translation, such as by assigning confidence ratings to different portions of the translation, as in content 514 in FIG. 5 (step 1018). Process 1000 combines the confidence-rated translations, such as contents 514 and 516 to form combined translated output 520 (step 1020).

Process 1000 presents a confidence-rated transcribed and translated content (step 1022). Process 1000 ends thereafter.

The presentation of step 1022 may utilize textual presentation methods, graphical presentation methods, or a combination thereof to present the content and the confidence ratings associated with the portions thereof in the manner described earlier. In one embodiment, process 1000 may also present the confidence-rated transcription output of step 1010 and return to step 1012, as indicated by the dotted line in the flowchart. In another embodiment, process 1000 may also present the confidence-rated combined transcription output of step 1012 and return to step 1014, as indicated by the dotted line in the flowchart. In another embodiment, process 1000 may also present the confidence-rated translation output of step 1018 and return to step 1020, as indicated by the dotted line in the flowchart.

Figure 11:
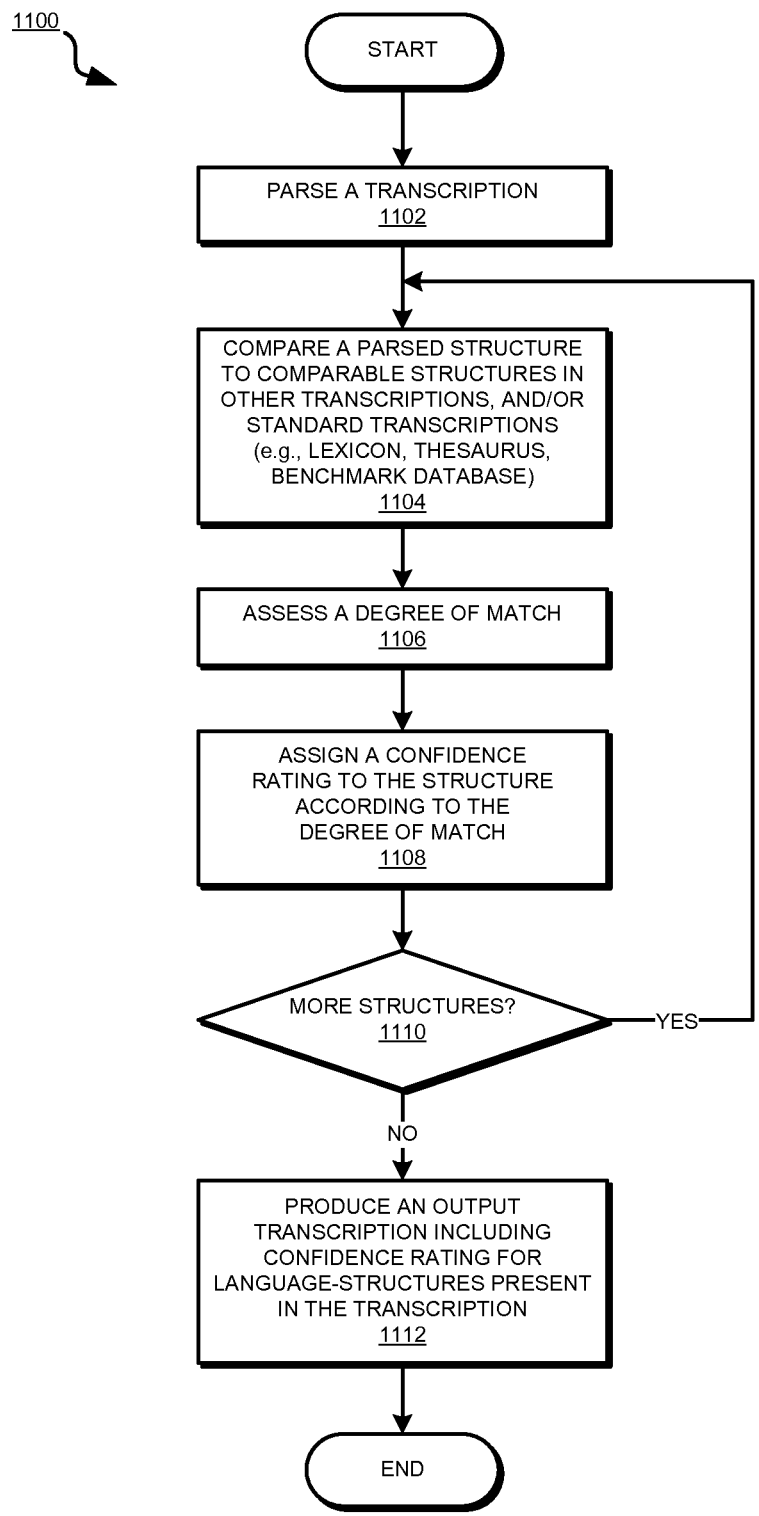
FIG. 11 depicts a flowchart of an example process of assigning a confidence rating to a transcription in accordance with an illustrative embodiment.

With reference to FIG. 11, this figure depicts a flowchart of an example process of assigning a confidence rating to a transcription in accordance with an illustrative embodiment. Process 1100 can be implemented in application 900 in FIG. 9, such as in the form of step 1010 in FIG. 10.

Process 1100 parses a transcription (step 1102). Process 1100 compares a parsed language structure in the transcription to comparable parsed structures in other transcriptions, and/or standard transcriptions, such as a lexicon, a thesaurus, or data in a benchmark database, or a combination thereof (step 1104). Process 1100 assesses a degree of match between the compared language structures (step 1106). Process 1100 assigns a confidence rating to the structure according to the degree of the match (step 1108).

Process 1100 determines whether more parsed language structures are to be processed in this manner (step 1110). If more parsed structures are to be processed ("Yes" path of step 1110), process 1100 returns to step 1104. If no more parsed structures are to be processed ("No" path of step 1110), process 1100 produces an output transcription including confidence rating for the language structures present in the transcription (step 1112). Process 1100 ends thereafter.

Figure 12:
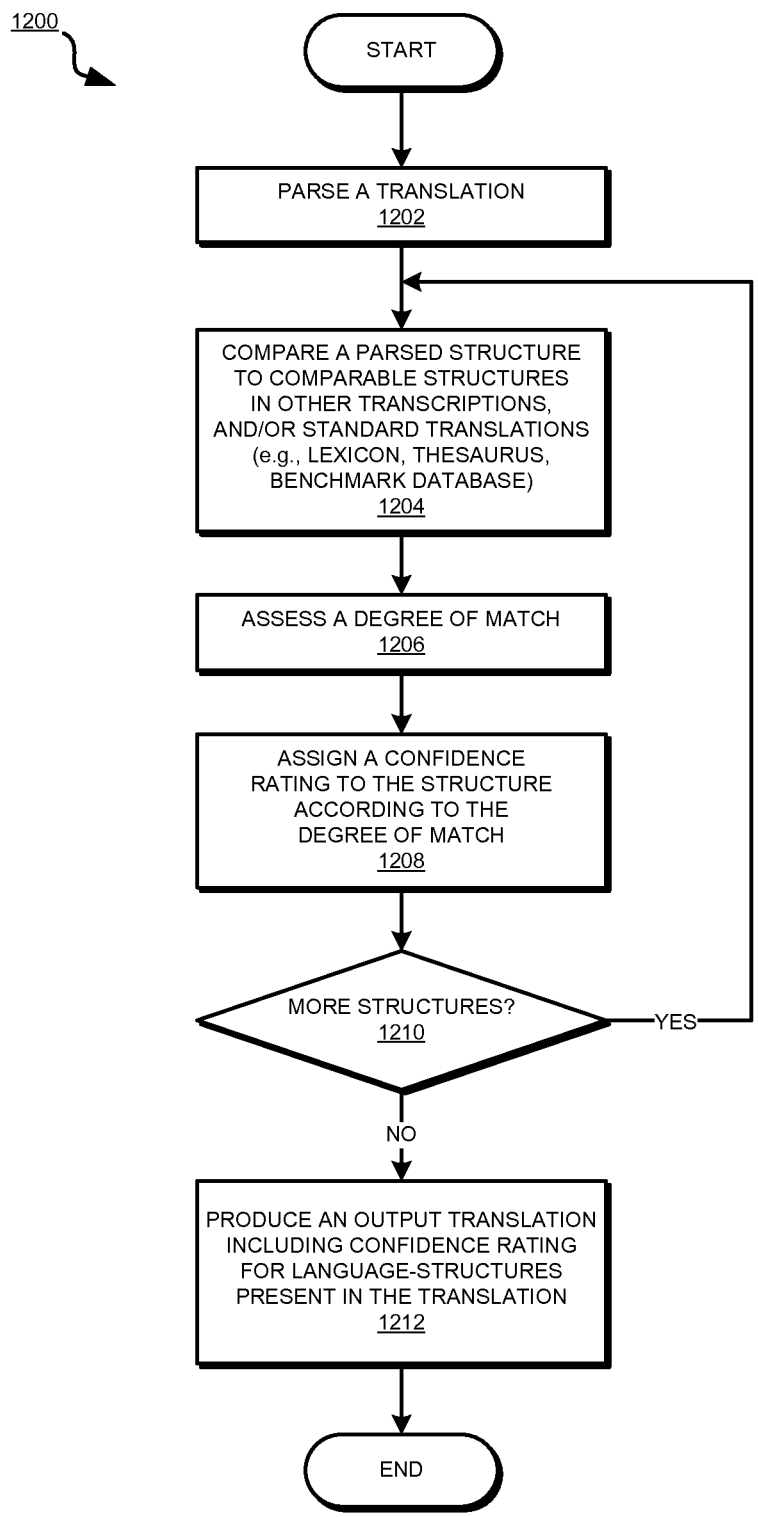
FIG. 12 depicts a flowchart of an example process of assigning a confidence rating to a translation in accordance with an illustrative embodiment.

With reference to FIG. 12, this figure depicts a flowchart of an example process of assigning a confidence rating to a translation in accordance with an illustrative embodiment. Process 1200 can be implemented in application 900 in FIG. 9, such as in the form of step 1018 in FIG. 10.

Process 1200 parses a translation (step 1202). Process 1200 compares a parsed language structure in the translation to comparable parsed structures in other translations, and/or standard translations, such as a lexicon, a thesaurus, or data in a benchmark database, or a combination thereof (step 1204). Process 1200 assesses a degree of match between the compared language structures (step 1206). Process 1200 assigns a confidence rating to the structure according to the degree of the match (step 1208).

Process 1200 determines whether more parsed language structures are to be processed in this manner (step 1110). If more parsed structures are to be processed ("Yes" path of step 1210), process 1200 returns to step 1204. If no more parsed structures are to be processed ("No" path of step 1210), process 1200 produces an output translation including confidence rating for the language structures present in the translation (step 1212). Process 1200 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for creating confidence-rated transcription and translation. Using an embodiment, input data can be transcribed with confidence indications corresponding to various parts of the transcription. Several confidence-rated transcriptions can be combined to increase the confidence in at least some portions of the combined transcription as compared to the confidence level in a similar portion of just one transcription.

Using an embodiment, confidence-rated transcribed data can be translated with confidence indications corresponding to various parts of the translation. Several confidence-rated translations can be combined to increase the confidence in at least some portions of the combined translation as compared to the confidence level in a similar portion of just one translation.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer implemented method for creating confidence-rated transcription and translation, the method comprising:
    providing an input in a first form to a set of transcription applications executing using a processor and a memory;
    receiving a set of transcriptions from the set of transcription applications;
    assigning a first set of confidence ratings to a first transcription to form a confidence-rated first transcription, and assigning a second set of confidence ratings to a second transcription in the set of transcriptions to form a confidence-rated second transcription, wherein a confidence rating in the first set of confidence ratings corresponds to a portion of the first transcription, and wherein a confidence rating in the second set of confidence ratings corresponds to a portion of the second transcription;
    combining the confidence-rated first transcription and the confidence-rated second transcription to form a combined confidence-rated transcription;
    providing the combined confidence-rated transcription to a set of translation applications;
    receiving a set of translations from the set of translation applications;
    assigning a third set of confidence ratings to a first translation to form a confidence-rated first translation, and assigning a fourth set of confidence ratings to a second translation in the set of translations to form a confidence-rated second translation;
    combining the confidence-rated first translation and the confidence-rated second translation to form a combined confidence-rated translation; and
    presenting the combined confidence-rated translation.

2. The computer implemented method of claim 1, wherein assigning the confidence rating to the first transcription further comprises:
    parsing the first transcription into a set of language structures according to a language of the first transcription;
    comparing a language structure in the set of language structures with a comparable language structure in a reference data;
    determining a degree of match between the language structure and the comparable language structure; and
    assigning a confidence rating to the language structure according to the degree of the match.

3. The computer implemented method of claim 2, wherein the reference data is the second transcription.

4. The computer implemented method of claim 2, wherein the reference data is a crowd-sourced transcription of a part of the input.

5. The computer implemented method of claim 2, wherein the confidence rating assigned to the language structure is relative to a confidence threshold.

6. The computer implemented method of claim 1, wherein a first portion of the confidence-rated first transcription corresponds to a second portion of the confidence-rated second transcription, the combining further comprising:
    selecting the first portion of the confidence-rated first transcription over the second portion of the confidence-rated second transcription responsive to a confidence rating associated with the first portion in the first set of confidence ratings is higher than a confidence rating associated with the second portion in the second set of confidence ratings; and
    including the first portion in the combined confidence-rated transcription.

7. The computer implemented method of claim 1, wherein assigning the confidence rating to the first translation further comprises:
    parsing the first translation into a set of language structures according to a language of the first translation;
    comparing a language structure in the set of language structures with a comparable language structure in a second reference data;
    determining a degree of match between the language structure and the comparable language structure; and
    assigning a confidence rating to the language structure according to the degree of the match.

8. The computer implemented method of claim 7, wherein the reference data is the second translation.

9. The computer implemented method of claim 7, wherein the reference data is a crowd-sourced translation of one of (i) a transcription in the set of transcription, and (ii) the input.

10. The computer implemented method of claim 7, wherein the confidence rating assigned to the language structure is relative to a confidence threshold.

11. The computer implemented method of claim 1, wherein a third portion of the confidence-rated first translation corresponds to a fourth portion of the confidence-rated second translation, the combining further comprising:
    selecting the third portion of the confidence-rated first translation over the fourth portion of the confidence-rated second translation responsive to a confidence rating associated with the third portion in the third set of confidence ratings is higher than a confidence rating associated with the fourth portion in the fourth set of confidence ratings; and
    including the third portion in the combined confidence-rated translation.

12. The computer implemented method of claim 1, wherein the first transcription in the set of transcriptions is generated by a first transcription application in the set of transcription applications and the second transcription in the set of transcriptions is generated by a second transcription application in the set of transcription applications, and wherein the first and the second transcription applications are distinct applications.

13. The computer implemented method of claim 1, wherein the first transcription in the set of transcriptions is generated by a first transcription application in the set of transcription applications and the second transcription in the set of transcriptions is generated by a second transcription application in the set of transcription applications, wherein the first and the second transcription applications are distinct instances of a common transcription application, and wherein the distinct instances of the common transcription application generate the first and the second transcriptions using different transcription data.

14. The computer implemented method of claim 1, wherein the first translation in the set of translations is generated by a first translation application in the set of translation applications and the second translation in the set of translations is generated by a second translation application in the set of translation applications, and wherein the first and the second translation applications are distinct applications.

15. The computer implemented method of claim 1, wherein the first translation in the set of translations is generated by a first translation application in the set of translation applications and the second translation in the set of translations is generated by a second translation application in the set of translation applications, wherein the first and the second translation applications are distinct instances of a common translation application, and wherein the distinct instances of the common translation application generate the first and the second translations using different translation data.

16. The computer implemented method of claim 1, wherein the presenting the combined confidence-rated translation further comprises:
presenting a combination of the first, second, third, and the fourth sets of confidence ratings.

17. The computer implemented method of claim 16, wherein the presenting the combination further comprises:
presenting a confidence rating in one of the first and second sets of confidence ratings using a textual depiction.

18. The computer implemented method of claim 16, wherein the presenting the combination further comprises:
presenting a confidence rating in one of the first and second sets of confidence ratings using a graphical depiction.

19. The computer implemented method of claim 1, wherein the input in the first form is an audio input received from an audio input device, further comprising:
receiving the audio input;
pre-processing the audio input to create an input in a second form; and
providing the input in the second form to a transcription application in the set of transcription applications.

20. A computer usable program product comprising a computer usable storage device including computer usable code for creating confidence-rated transcription and translation, the computer usable code comprising:
computer usable code for providing an input in a first form to a set of transcription applications executing using a processor and a memory;
computer usable code for receiving a set of transcriptions from the set of transcription applications;
computer usable code for assigning a first set of confidence ratings to a first transcription to form a confidence-rated first transcription, and assigning a second set of confidence ratings to a second transcription in the set of transcriptions to form a confidence-rated second transcription, wherein a confidence rating in the first set of confidence ratings corresponds to a portion of the first transcription, and wherein a confidence rating in the second set of confidence ratings corresponds to a portion of the second transcription;
computer usable code for combining the confidence-rated first transcription and the confidence-rated second transcription to form a combined confidence-rated transcription;
computer usable code for providing the combined confidence-rated transcription to a set of translation applications;
computer usable code for receiving a set of translations from the set of translation applications;
computer usable code for assigning a third set of confidence ratings to a first translation to form a confidence-rated first translation, and assigning a fourth set of confidence ratings to a second translation in the set of translations to form a confidence-rated second translation;
computer usable code for combining the confidence-rated first translation and the confidence-rated second translation to form a combined confidence-rated translation; and
computer usable code for presenting the combined confidence-rated translation.

21. The computer usable program product of claim 20, wherein the computer usable code for assigning the confidence rating to the first transcription further comprises:
computer usable code for parsing the first transcription into a set of language structures according to a language of the first transcription;
computer usable code for comparing a language structure in the set of language structures with a comparable language structure in a reference data;
computer usable code for determining a degree of match between the language structure and the comparable language structure; and
computer usable code for assigning a confidence rating to the language structure according to the degree of the match.

22. The computer usable program product of claim 21, wherein the reference data is the second transcription.

23. The computer usable program product of claim 20, wherein the computer usable code is stored in a computer readable storage medium in a data processing system, and wherein the computer usable code is transferred over a network from a remote data processing system.

24. The computer usable program product of claim 20, wherein the computer usable code is stored in a computer readable storage medium in a server data processing system, and wherein the computer usable code is downloaded over a network to a remote data processing system for use in a computer readable storage medium associated with the remote data processing system.

25. A data processing system for creating confidence-rated transcription and translation, the data processing system comprising:
a storage device including a storage medium, wherein the storage device stores computer usable program code; and a processor, wherein the processor executes the computer usable program code, and wherein the computer usable program code comprises:

computer usable code for providing an input in a first form to a set of transcription applications executing using a processor and a memory;

computer usable code for receiving a set of transcriptions from the set of transcription applications;

computer usable code for assigning a first set of confidence ratings to a first transcription to form a confidence-rated first transcription, and assigning a second set of confidence ratings to a second transcription in the set of transcriptions to form a confidence-rated second transcription, wherein a confidence rating in the first set of confidence ratings corresponds to a portion of the first transcription, and wherein a confidence rating in the second set of confidence ratings corresponds to a portion of the second transcription;

computer usable code for combining the confidence-rated first transcription and the confidence-rated second transcription to form a combined confidence-rated transcription;

computer usable code for providing the combined confidence-rated transcription to a set of translation applications;

computer usable code for receiving a set of translations from the set of translation applications;

computer usable code for assigning a third set of confidence ratings to a first translation to form a confidence-rated first translation, and assigning a fourth set of confidence ratings to a second translation in the set of translations to form a confidence-rated second translation;

computer usable code for combining the confidence-rated first translation and the confidence-rated second translation to form a combined confidence-rated translation; and computer usable code for presenting the combined confidence-rated translation.

\* \* \* \* \*